United States Patent
Huang et al.

(10) Patent No.: US 10,255,243 B2
(45) Date of Patent: Apr. 9, 2019

(54) DATA PROCESSING METHOD AND DATA PROCESSING SYSTEM

(71) Applicants: Yulong Computer Telecommunication Scientific (Shenzhen) Co., Ltd., Shenzhen, Guangdong (CN); Dongguan Yulong Telecommunication Tech Co., Ltd., Dongguan, Guangdong (CN)

(72) Inventors: Wei Huang, Guangdong (CN); Kui Wang, Guangdong (CN)

(73) Assignees: DONGGUAN YULONG TELECOMMUNICATION TECH CO., LTD., Dongguan, Guangdong (CN); YULONG COMPUTER TELECOMMUNICATION SCIENTIFIC (SHENZHEN) CO., LTD., Shenzhen, Guangdong (CN)

( * ) Notice: Subject to any disclaimer, the term of this patent is extended or adjusted under 35 U.S.C. 154(b) by 232 days.

(21) Appl. No.: 14/888,004

(22) PCT Filed: Jun. 25, 2013

(86) PCT No.: PCT/CN2013/077929
§ 371 (c)(1),
(2) Date: Oct. 29, 2015

(87) PCT Pub. No.: WO2014/205658
PCT Pub. Date: Dec. 31, 2014

(65) Prior Publication Data
US 2016/0078056 A1 Mar. 17, 2016

(51) Int. Cl.
*G06F 16/50* (2019.01)
*G06F 16/583* (2019.01)
(Continued)

(52) U.S. Cl.
CPC ............ *G06F 16/50* (2019.01); *G06F 3/0482* (2013.01); *G06F 16/532* (2019.01);
(Continued)

(58) Field of Classification Search
CPC ............ G06F 17/30244; G06F 3/0482; G06F 17/30247; G06F 17/30277; G06Q 30/02; G06Q 30/06; G06Q 30/0623; H04W 84/18
See application file for complete search history.

(56) References Cited

U.S. PATENT DOCUMENTS 8,718,369 B1 * 5/2014 Tompkins ......... G06F 17/30259
382/181
2010/0138478 A1 * 6/2010 Meng ................. H04N 5/44591
709/203
(Continued)

FOREIGN PATENT DOCUMENTS

CN 101032579 A 9/2007
CN 101945264 A 1/2011
CN 102592233 A 7/2012

*Primary Examiner* — Christopher Braniff
(74) *Attorney, Agent, or Firm* — Osha Liang LLP

(57) ABSTRACT

The invention provides a data processing method, comprising: a first terminal performs image acquisition on at least one photographic object entity, and encodes the image and corresponding recognition information to form video data which is sent to a second terminal; the second terminal performs data separation on the video data to obtain a video file and recognition information associated with at least one photographic object in the video file; the second terminal recognizes at least one photographic object in the video file according to the recognition information, and forms a corresponding operation area in the video file; and when the video file is played, the second terminal performs an associated operation function according to a detected operation action on a designated operation area.

18 Claims, 6 Drawing Sheets

(51) Int. Cl.
  *G06Q 30/06* (2012.01)
  *G06F 16/532* (2019.01)
  *G06Q 30/02* (2012.01)
  *G06F 3/0482* (2013.01)
  *G06F 17/30* (2006.01)
  *H04W 84/18* (2009.01)

(52) U.S. Cl.
  CPC ...... *G06F 16/583* (2019.01); *G06F 17/30244* (2013.01); *G06F 17/30247* (2013.01); *G06F 17/30277* (2013.01); *G06Q 30/02* (2013.01); *G06Q 30/06* (2013.01); *G06Q 30/0623* (2013.01); *H04W 84/18* (2013.01)

(56) References Cited

U.S. PATENT DOCUMENTS

2012/0263154 A1* 10/2012 Blanchflower ... G06F 17/30247
                                                    370/338
2013/0031176 A1   1/2013 Shih et al.
2015/0036528 A1*  2/2015 Liu ....................... H04W 24/10
                                                    370/252

\* cited by examiner

DATA PROCESSING METHOD AND DATA PROCESSING SYSTEM

FIELD OF THE INVENTION

The present invention relates to the field of data processing technology, and specifically relates to a data processing method and a data processing system.

BACKGROUND OF THE INVENTION

At present, when shopping online, a user purchases products by browsing webpage pictures, but unfortunately the deviation between the real goods purchased and the online photos is relatively large, which results in a lot of disputes.

The user cannot fully know about an object through the pictures, but if the same object is described by means of video, especially through video acquisition performed on the real goods in offline stores, the user perception of the same object will undoubtedly be enhanced, and the user's shopping experience will be greatly improved by helping and allowing the user to perform an operation on objects of interest while watching the video.

In the prior art, however, in the process of watching a video, for example when seeing some items of interest, people cannot perform operations such as purchasing unless otherwise by searching on the network and so forth.

For example, the user has to separately open a browser, search by entering the name of the item, or "Search by Image" after a screenshot is taken, so as to enter the website of an online business and then make the purchase. By entering the name of the item and so forth, it is difficult indeed to successfully find the relevant item by search, and even more difficult to perform operations such as purchasing when the user cannot know its exact name.

Therefore, there is a need for a new technical solution, whereby a photographic object in a video may be recognized, and a user may, when watching the video, directly perform an operation on the photographic object in the video without needing to perform operations by separately searching the network and so forth, so as to help simplify the user operation and improve the user experience.

SUMMARY OF THE INVENTION

Just based on the above problem, the invention provides a new data processing scheme, whereby a photographic object in a video may be recognized, and a user may, when watching the video, directly perform an operation the photographic object in the video without needing to perform operations by separately searching the network and so forth, so as to help simplify the user operation and improve the user experience.

In view of this, the present invention provides a data processing method, including: a first terminal performs image acquisition on at least one photographic object entity, and encodes the acquired image and recognition information corresponding to at least one of the photographic object entities to form video data which is sent to a second terminal through a network; the second terminal receives the video data, performs data separation on the video data to obtain a video file and recognition information associated with at least one photographic object in the video file; the second terminal recognizes at least one photographic object in the video file according to the recognition information, and forms an operation area corresponding to at least one of the photographic objects in the video file; and when the video file is played, the second terminal, according to a detected operation action on a designated operation area, performs an operation function associated with a designated photographic object corresponding to the designated operation area.

In the technical solution, through recognition of the photographic object in the video, a user may, when watching a video, directly perform an operation on the recognized object, so as to improve the user experience. The corresponding operation area created by recognizing the photographic object in the video may be an area corresponding to the edge of display of the photographic object, or a rectangular area or the like which contains the photographic object; specifically, the operation area may be transparent, or may be displayed in a certain condition (for example when a video playing mode capable of showing the operation area is set and entered). Since the video is dynamic, when the photographic object in the video moves (it moves on its own, or the relative position of the photographic object is changed on the terminal screen due to the movement of the lens), the corresponding operation area should also change accordingly so that the user only has to directly perform an operation on the photographic object without needing to pay special attention to the position of the operating area.

Preferably, the video data may be obtained and then transmitted to the second terminal by the first terminal, or especially may be obtained in real time by the first terminal and transmitted to the second terminal through the network. When in the process of shooting, the first terminal obtains the recognition information of the photographic object being shot, and the first terminal encodes that information and the photographic video file into video data, so the first terminal does not have to perform analysis and feature acquisition on the photographic object, thus reducing the requirement for the first terminal, and facilitating recognition of the photographic object in the video by the second terminal.

In the above technical solution, preferably, the method further includes: the first terminal receives recognition information corresponding thereto sent by at least one of the photographic object entities, so as to encode the information into the video data.

In the technical solution, the recognition information may be obtained by the first terminal from the photographic object entity, which helps establish an actual association between the recognition information and the specific photographic object entity to facilitate managing the photographic object entity and the corresponding recognition information.

In the above technical solution, preferably, the method further includes: the second terminal matches the content in the image frame of the video file with pre-stored recognition features to recognize at least one photographic object in the video file.

In the technical solution, the recognition features of one or more objects are pre-stored in the second terminal or in a cloud storage space corresponding to the second terminal, so that at any moment after the second terminal obtains the video file, or in the process of playing the video file (pre-obtained or received in real time), the content in the image frame of the video is matched with pre-stored recognition features to recognize the photographic object in the video. Since the pre-stored recognition features are used, no special requirement exists for the video file itself, all video files may be suitable for the technical solution, they may be downloaded from the network by the second terminal, obtained from another terminal, or shot by the second terminal itself, and thus there is greater versatility. Meanwhile, since the photographic object in a video file is not always in change, after the photographic object in an image frame is recognized, the image frame may be compared with the pixel information in one or more image frames following it to determine whether a change in the photographic object occurs; if a change exists, recognition may be performed; otherwise, no re-recognition is needed, so as to help improve the recognition efficiency and reduce the requirement for the processing capability of the terminal.

Accordingly, each pre-stored recognition feature may, in simple terms, be the image of an object, in which case the object may be recognized by comparing with the picture in the video file; further, the recognition features may also be some characteristic parameters; for example, for "clothes", parameters such as "an opening in the front and symmetrical sleeves to the left and right" may be included so that the second terminal can "know" what "clothes" are, and additionally with the features such as color, size, and style of the clothes themselves which need to be recognized, intelligent recognition of the "clothes" may be realized by the second terminal. Meanwhile, that the recognition feature is pre-stored in the second terminal itself and that it is according to the recognition information sent by the first terminal are not contradictory; the object may be recognized by only using one of them, or using both at the same time.

In the above technical solution, preferably, the process of the second terminal performing data separation on the video data includes: analyzing the video data, extracting a recognition frame from the video data, and obtaining the video file remaining after the recognition frame is extracted; and further extracting the recognition information from the recognition frame, so as to perform a recognition operation on the video file.

In the technical solution, a recognition frame containing recognition information may be added to the middle or both ends of the data stream corresponding to the video file. In order to realize the separation of the video data, the frame head part of the recognition frame should contain type identification for recognizing the type of the recognition frame in the video data by the second terminal; after the above type identification is recognized, it is determined that the data frame is a recognition frame; specifically, for example the recognition frame head mainly consists of special characters, so as to identify the recognition frame. After that, the second terminal continues to analyze other information such as recognition frame length, so as to completely determine the corresponding recognition frame. The recognition frame should further include an information part which contains the recognition information and the like of the photographic object, so as to recognize the photographic object in the video. The way of using the recognition frame can make it convenient that the recognition information is encoded in the video data, and make it convenient that the recognition frame is worked out from the video data by analysis, the recognition information of the photographic object is extracted from the information part of the recognition frame, and the photographic object in the video file is recognized through the recognition information.

In the above technical solution, preferably, the method further includes: at least one of the first terminals is taken as a parent node, and all of the photographic object entities are taken as children nodes, so as to form an Ad Hoc hierarchical network structure.

In the technical solution, the Ad Hoc hierarchical network structure does not have to rely on the existing fixed communication network infrastructure, and can rapidly spread the used network system. Network nodes in the network cooperate with each other, and communicate and exchange information via wireless links, to share information and service. Each network node can dynamically, optionally, frequently enter and leave the network often without needing to warn or inform in advance, and without damaging the communication between other nodes in the network. The first terminal may be a camera, the camera is taken as the parent node of Ad Hoc, the photographic objects (such as clothes) are taken as the children nodes, then according to the structural characteristics of the Ad Hoc network, one parent node (i.e., camera) may correspond to a plurality of children nodes (i.e., a plurality of the above information transceiving devices), and different network nodes do not influence each other, so as to improve the stability and flexibility of the video acquisition system.

In the above technical solution, preferably, the method further includes: the first terminal further receives controllable information corresponding thereto sent by the at least one of the photographic object entities, wherein the first terminal encodes the controllable information and the recognition information in association into the video data, and the second terminal further obtains controllable information associated with at least one of the photographic objects from the video data, and performs an operation function on the designated photographic object according to the controllable information when the operation action on the designated operation area is detected; or when the second terminal detects the operation action on the designated operating area and reports the detection result up to the first terminal, the first terminal sends the controllable information corresponding to the designated operation area to the second terminal so that the second terminal performs an operation function on the designated photographic object according to the controllable information.

In the technical solution, the second terminal may perform default processing operations on all photographic objects, for example perform amplification processing on all of the clicked photographic objects, store each clicked photographic object, or directly call a browser to perform "Search by Image" on the clicked photographic object. Certainly, in order to realize more processing operation modes, the controllable information and recognition information may be associated and encoded into the video data, so that when the user performs an operation on the recognized photographic object, the second terminal performs a corresponding function according to the controllable information. Specifically, the controllable information may be encoded into the above recognition frame, or separately encoded as a control information frame, and the recognition frame (the control information frame may also be included) is integrated with the video file obtained by shooting so as to form video data. The second terminal performs a corresponding function according to the controllable information worked out by analysis. After being worked out by analysis by the second terminal, the controllable information may, together with the associated recognition information, be stored in a matching database, then when the user performs an operation on the recognized photographic object, the controllable information associated with the recognition information of the designated object is retrieved from the matching database to perform an operation function on the photographic object.

Certainly, when the first terminal encodes the controllable information into the video data, the controllable information and the recognition information associated with the photographic object in the video data are often sent together to the second terminal; however, in order to save network resources and increase the transmission speed of the video data, the first terminal may, according to the detection result reported by the second terminal, send the corresponding controllable information to the second terminal only when an operation action exists in the operation area corresponding to a photographic object, which helps save the storage space of the second terminal.

In the above technical solution, preferably, the controllable information includes: menu data, link information, and control command; and the operating function accordingly includes: creating and displaying a corresponding interactive menu according to the menu data, opening the link information, and executing the control command.

In the technical solution, specifically, for example when the user watches a shopping video by a cellphone, the cellphone recognizes a piece of clothing in the video, the user touches the screen to click on the operation area of the clothing, an interactive menu for example containing "buy, price, advice" pops up, or the "buy" page is directly linked to, and there may also be an amplification processing on the clothing image and so forth, so the further operation of the user is facilitated.

The present invention further provides a data processing system, including a first terminal and a second terminal, wherein the first terminal includes an image acquisition unit for performing image acquisition on at least one photographic object entity; an encoding unit for encoding the acquired image and recognition information corresponding to at least one of the photographic object entities to form video data; and a video data sending unit for sending the video data formed by the encoding unit to the second terminal through a network; meanwhile, the second terminal includes: a video data receiving unit for receiving the video data; a data separation unit for performing data separation on the video data to obtain a video file and recognition information associated with at least one photographic object in the video file; an recognizing unit for recognizing at least one photographic object in the video file according to the recognition information; an operation area creating unit for, according to the at least one recognized photographic object, forming an operation area corresponding to at least one of the photographic objects in the video file; a video playing unit for playing the video file; an operation action detecting unit for detecting an operation action on a designated operation area when the video playing unit plays the video file; and a processing unit for performing an operation function associated with the designated photographic object corresponding to the designated operation area when an operation action on the designated operation area is detected by the operation action detecting unit.

In the technical solution, through recognition of the photographic object in the video, a user may, when watching a video, directly perform an operation on the recognized object, so as to improve the user experience. The video file here may be a video transmitted in a wired or wireless mode after being shot by a camera in real time, or a non real-time video shot at any other moment. The corresponding operation area created by recognizing the photographic object in the video may be an area corresponding to the edge of display of the photographic object, or a rectangular area or the like which contains the photographic object; specifically, the operation area may be transparent, or may be displayed in a certain condition (for example when a video playing mode capable of showing the operation area is set and entered). Since the video is dynamic, when the photographic object in the video moves (it moves on its own, or the relative position of the photographic object is changed on the terminal screen due to the movement of the lens), the corresponding operation area should also change accordingly so that the user only has to directly perform an operation on the photographic object without needing to pay special attention to the position of the operating area.

Preferably, the video data may be obtained and then transmitted to the second terminal by the first terminal, or especially may be obtained in real time by the first terminal and transmitted to the second terminal through the network. When in the process of shooting, the first terminal obtains the recognition information of the photographic object being shot, and the first terminal encodes that information and the photographic video file into video data, so the first terminal does not have to perform analysis and feature acquisition on the photographic object, thus reducing the requirement for the first terminal, and facilitating recognition of the photographic object in the video by the second terminal.

In the above technical solution, preferably, the first terminal further includes: an information receiving unit for receiving recognition information corresponding thereto sent by at least one of the photographic object entities, so as to encode the information into the video data.

In the technical solution, the recognition information may be obtained by the first terminal from the photographic object entity, which helps establish an actual association between the recognition information and the specific photographic object entity to facilitate managing the photographic object entity and the corresponding recognition information.

In the above technical solution, preferably, the second terminal further includes: a pre-storing unit for pre-storing recognition features, wherein the recognizing unit matches the content in the image frame of the video file with the recognition features pre-stored in the pre-storing unit to recognize at least one photographic object in the video file.

In the technical solution, the recognition features of one or more objects is pre-stored in the second terminal or in a cloud storage space corresponding to the second terminal, so that at any moment after the second terminal obtains the video file, or in the process of playing the video file (pre-obtained or received in real time), the content in the image frame of the video is matched with pre-stored recognition features to recognize the photographic object in the video. Since the pre-stored recognition features are used, no special requirement exists for the video file itself, all video files may be suitable for the technical solution, they may be downloaded from the network by the second terminal, obtained from another terminal, or shot by the second terminal itself, and thus there is greater versatility. Meanwhile, since the photographic object in a video file is not always in change, after the photographic object in an image frame is recognized, the image frame may be compared with the pixel information in one or more image frames following it to determine whether a change in the photographic object occurs; if a change exists, recognition may be performed; otherwise, no re-recognition is needed, so as to help improve the recognition efficiency and reduce the requirement for the processing capability of the terminal.

Accordingly, each pre-stored recognition feature may, in simple terms, be the image of an object, in which case the object may be recognized by comparing with the picture in the video file; further, the recognition features may also be some characteristic parameters; for example, for "clothes", parameters such as "an opening in the front and symmetrical sleeves to the left and right" may be included so that the second terminal can "know" what "clothes" are, and additionally with the features such as color, size, and style of the clothes themselves which need to be recognized, intelligent recognition of the "clothes" may be realized by the second terminal. Meanwhile, that the recognition feature is pre-stored in the second terminal itself and that it is according to the recognition information sent by the first terminal are not contradictory; the object may be recognized by only using one of them, or using both at the same time.

In the above technical solution, preferably, the data separation unit includes: a frame extraction subunit for extracting a recognition frame from the video data, and obtaining the video file remaining after the recognition frame is extracted; a frame analysis subunit for further extracting the recognition information from the recognition frame, so as to allow the recognition unit to perform a recognition operation on the video file.

In the technical solution, a recognition frame containing recognition information may be added to the middle or both ends of the data stream corresponding to the video file. In order to realize the separation of the video data, the frame head part of the recognition frame should contain type identification for recognizing the type of the recognition frame in the video data by the second terminal; after the above type identification is recognized, it is determined that the data frame is a recognition frame; specifically, for example the recognition frame head mainly consists of special characters, so as to identify the recognition frame. After that, the second terminal continues to analyze other information such as recognition frame length, so as to completely determine the corresponding recognition frame. The recognition frame should further include an information part which contains the recognition information and the like of the photographic object, so as to recognize the photographic object in the video. The way of using the recognition frame can make it convenient that the recognition information is encoded in the video data, and make it convenient that the recognition frame is worked out from the video data by analysis, the recognition information of the photographic object is extracted from the information part of the recognition frame, and the photographic object in the video file is recognized through the recognition information.

In the above technical solution, preferably, the method further includes: at least one of the first terminals is taken as a parent node, and all of the photographic object entities are taken as children nodes, so as to form an Ad Hoc hierarchical network structure.

In the technical solution, the Ad Hoc hierarchical network structure does not have to rely on the existing fixed communication network infrastructure, and can rapidly spread the used network system. Network nodes in the network cooperate with each other, and communicate and exchange information via wireless links, to share information and service. Each network node can dynamically, optionally, frequently enter and leave the network often without needing to warn or inform in advance, and without damaging the communication between other nodes in the network. The first terminal may be a camera, the camera is taken as the parent node of Ad Hoc, the photographic objects (such as clothes) are taken as the children nodes, then according to the structural characteristics of the Ad Hoc network, one parent node (i.e., camera) may correspond to a plurality of children nodes (i.e., a plurality of the above information transceiving devices), and different network nodes do not influence each other, so as to improve the stability and flexibility of the video acquisition system.

In the above technical solution, preferably, the first terminal further receives controllable information corresponding thereto sent by the at least one of the photographic object entities, wherein the encoding unit is further used for encoding the controllable information and the recognition information in association into the video data; the data separation unit is further used for obtaining controllable information associated with at least one of the photographic objects from the video data; the processing unit is further used for performing an operation function on the designated photographic object according to the controllable information when the operation action on the designated operation area is detected; or when an operation action on the designated operating area is detected, the second terminal further reports the detection result up to the first terminal, and the first terminal sends the controllable information corresponding to the designated operation area accordingly to the second terminal so that the processing unit performs an operation function on the designated photographic object according to the controllable information.

In the technical solution, the second terminal may perform default processing operations on all photographic objects, for example perform amplification processing on all of the clicked photographic objects, store each clicked photographic object, or directly call a browser to perform "Search by Image" on the clicked photographic object. Certainly, in order to realize more processing operation modes, the controllable information and recognition information may be associated and encoded into the video data, so that when the user performs an operation on the recognized photographic object, the second terminal performs a corresponding function according to the controllable information. Specifically, the controllable information may be encoded into the above recognition frame, or separately encoded as a control information frame, and the recognition frame (the control information frame may also be included) is integrated with the video file obtained by shooting so as to form video data. The second terminal performs a corresponding function according to the controllable information worked out by analysis. After being worked out by analysis by the second terminal, the controllable information may, together with the associated recognition information, be stored in a matching database, then when the user performs an operation on the recognized photographic object, the controllable information associated with the recognition information of the designated object is retrieved from the matching database to perform an operation function on the photographic object.

Certainly, when the first terminal encodes the controllable information into the video data, the controllable information and the recognition information associated with the photographic object in the video data are often sent together to the second terminal; however, in order to save network resources and increase the transmission speed of the video data, the first terminal may, according to the detection result reported by the second terminal, send the corresponding controllable information to the second terminal only when an operation action exists in the operation area corresponding to a photographic object, which helps save the storage space of the second terminal.

In the above technical solution, preferably, the controllable information separated by the data separation unit includes: menu data, link information, and control command; and the operating function performed by the processing unit accordingly includes: creating and displaying a corresponding interactive menu according to the menu data, opening the link information, and executing the control command.

In the technical solution, specifically, for example when the user watches a shopping video by a cellphone, the cellphone recognizes a piece of clothing in the video, and the user touches the screen to click on the operation area of the clothing, then an interactive menu for example containing "buy, price, advice" pops up, or the "buy" page is directly linked to, and there may also be an amplification processing on the clothing image and so forth, so the further operation of the user is facilitated.

According to the above technical solution, the photographic object in the video may be recognized, and a user may, when watching a video, directly perform an operation on the photographic object in the video without needing to perform operations by separately searching the network and so forth, which helps simplify the user operation and improve the user experience.

DETAILED DESCRIPTION OF THE EMBODIMENTS

In order to enable a clearer understanding of the above objects, features, and advantages of the present invention, the present invention is further described in detail below in conjunction with the accompanying drawings and the specific embodiments. It should be noted that, without conflict, the embodiments of the present application and the features in the embodiments may be combined with each other.

In the following description, numerous specific details are set forth in order to fully understand the present invention; however, the present invention can also be implemented in other ways different from those described herein; therefore, the scope of the present invention is not limited to the specific embodiments disclosed below.

Figure 1:
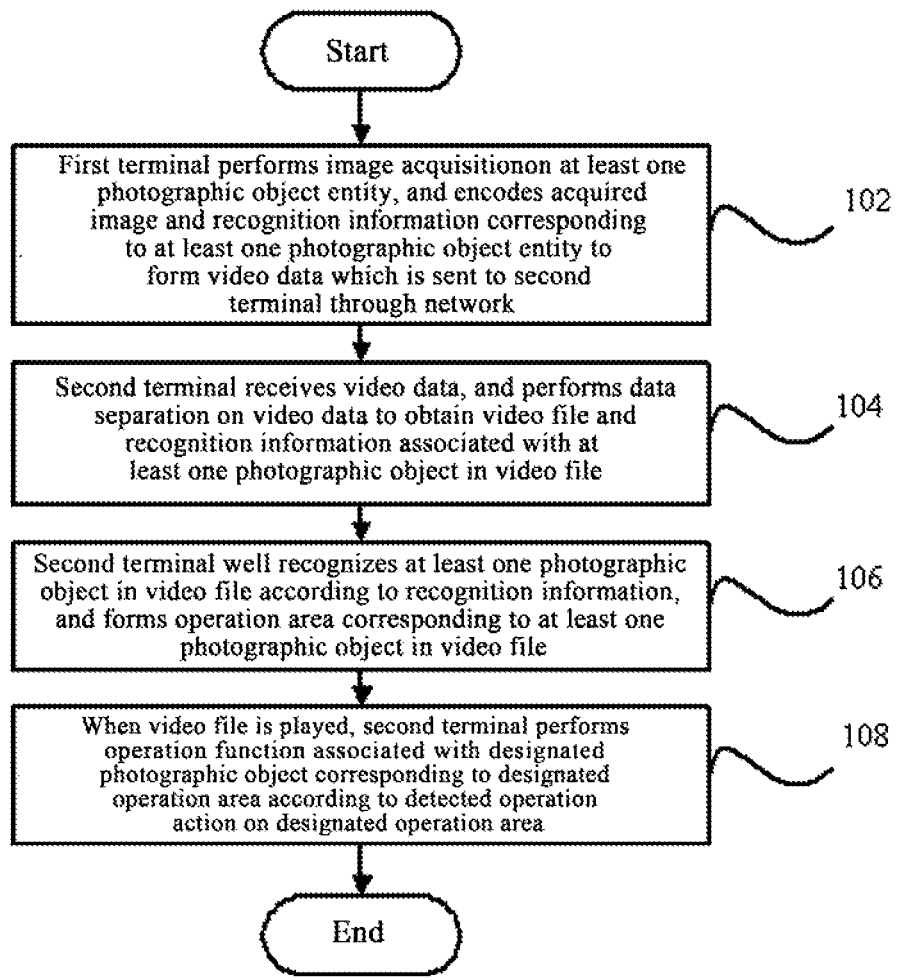
FIG. 1 shows a flowchart of a data processing method according to an embodiment of the present invention.

FIG. 1 shows a flowchart of a data processing method according to an embodiment of the present invention.

As shown in FIG. 1, the data processing method according to the embodiment of the present invention includes: step 102, a first terminal performs image acquisition on at least one photographic object entity, and encodes the acquired image and recognition information corresponding to at least one of the photographic object entities to form video data which is sent to a second terminal through a network; step 104, the second terminal receives the video data, performs data separation on the video data to obtain a video file and recognition information associated with at least one photographic object in the video file; step 106, the second terminal recognizes at least one photographic object in the video file according to the recognition information, and forms an operation area corresponding to at least one of the photographic objects in the video file; and step 108, when the video file is played, according to a detected operation action on a designated operation area, the second terminal performs an operation function associated with a designated photographic object corresponding to the designated operation area.

In the technical solution, through recognition of the photographic object in the video, a user may, when watching a video, directly perform an operation on the recognized object, so as to improve the user experience. The video file here may be a video transmitted in a wired or wireless mode after being shot by a camera in real time, or a non real-time video shot at any other moment. The corresponding operation area created by recognizing the photographic object in the video may be an area corresponding to the edge of display of the photographic object, or a rectangular area or the like which contains the photographic object; specifically, the operation area may be transparent, or may be displayed in a certain condition (for example when a video playing mode capable of showing the operation area is set and entered). Since the video is dynamic, when the photographic object in the video moves (it moves on its own, or the relative position of the photographic object is changed on the terminal screen due to the movement of the lens), the corresponding operation area should also change accordingly so that the user only has to directly perform an operation on the photographic object without needing to pay special attention to the position of the operating area.

Preferably, the video data may be obtained and then transmitted to the second terminal by the first terminal, or especially may be obtained in real time by the first terminal and transmitted to the second terminal through the network. When in the process of shooting, the first terminal obtains the recognition information of the photographic object being shot, and encodes that information and the photographic video file into video data, so the first terminal does not have to perform analysis and feature acquisition on the photographic object, thus reducing the requirement for the first terminal, and facilitating recognition of the photographic object in the video by the second terminal.

Specifically, for example when watching a video by a cellphone, computer or other terminal device, a user clicks on a piece of clothing in the video (or instead, for example, places the mouse in the operation area corresponding to the photographic object); if the clothing is a recognized photographic object, then a corresponding operation may be realized, which includes, for example, linking to a webpage (calling a browser and switching to the browser interface, or displaying on the video player interface in the form of a bubble box) that provides the brand information and/or purchase information about the clothing; for another example, a menu containing "buy, price, advice" (which is taken as an example, and the menu may also contain other information) pops up, and the user may realize further control operation by selection operations on the menu.

In addition, the photographic object entity corresponds to a storage device and an information transceiving device, wherein the storage device stores the recognition information of the photographic object entity, which is pre-stored in the storage device, and the information transceiving device is used for sending the recognition information to the first terminal. When the first terminal performs an acquisition on the recognition information of the photographic object entity, it may be achieved by sending a recognition information acquisition instruction, and then the information transceiving device receiving that instruction sends corresponding recognition information to the first terminal. The storage device and the information transceiving device may be located in the photographic object entity; for example, the photographic object entity is a smart phone; the storage device and the information transceiving device may also be associated with the photographic object entity, for example be connected to the photographic object entity, be placed near the photographic object entity, or be such that since the storage device contains the recognition information of a photographic object entity and the information transceiving device is used for transmitting the recognition information, the photographic object entity is considered to be associated with the storage device and the information transceiving device.

Further, one storage device may correspond to one or more photographic object entities, and one information transceiving device may also correspond to one or more storage devices. When receiving the recognition information acquisition instruction sent by the first terminal, the information transceiving device may send all of the recognition information in the storage device associated therewith to the first terminal; or it is also possible to provide another image acquisition device, which determines the photographic object entity shot by it by monitoring the real-time state of the first terminal, so that the information transceiving device only sends this part of recognition information of the photographic object entity capable of being shot to the first terminal, and so that the amount of data to be processed by the first terminal is reduced.

In the above technical solution, preferably, the method further includes: the first terminal receives recognition information corresponding thereto sent by at least one of the photographic object entities, so as to encode the information into the video data.

In the technical solution, the recognition information may be obtained by the first terminal from the photographic object entity, which helps establish an actual association between the recognition information and the specific photographic object entity to facilitate managing the photographic object entity and the corresponding recognition information.

In the above technical solution, preferably, the method further includes: the second terminal matches the content in the image frame of the video file with pre-stored recognition features to recognize at least one photographic object in the video file.

In the technical solution, the recognition features of one or more objects are pre-stored in the second terminal or in a cloud storage space corresponding to the second terminal, so that at any moment after the second terminal obtains the video file, or in the process of playing the video file (pre-obtained or received in real time), the content in the image frame of the video is matched with pre-stored recognition features to recognize the photographic object in the video. Since the pre-stored recognition features are used, no special requirement exists for the video file itself, all video files may be suitable for the technical solution, they may be downloaded from the network by the second terminal, obtained from another terminal, or shot by the second terminal itself, and thus there is greater versatility. Meanwhile, since the photographic object in a video file is not always in change, after the photographic object in an image frame is recognized, the image frame may be compared with the pixel information in one or more image frames following it to determine whether a change in the photographic object occurs; if a change exists, recognition may be performed; otherwise, no re-recognition is needed, so as to help improve the recognition efficiency and reduce the requirement for the processing capability of the terminal.

Accordingly, each pre-stored recognition feature may, in simple terms, be the image of an object, in which case the object may be recognized by comparing with the picture in the video file; further, the recognition features may also be some characteristic parameters; for example, for "clothes", parameters such as "an opening in the front and symmetrical sleeves to the left and right" may be included so that the second terminal can "know" what "clothes" are, and additionally with the features such as color, size, and style of the clothes themselves which need to be recognized, intelligent recognition of the "clothes" may be realized by the second terminal. Meanwhile, that the recognition feature is pre-stored in the second terminal itself and that it is according to the recognition information sent by the first terminal are not contradictory; the object may be recognized by only using one of them, or using both at the same time.

Preferably, in the above technical solution, the process of the second terminal performing data separation on the video data includes: analyzing the video data, extracting a recognition frame from the video data, and obtaining the video file remaining after the recognition frame is extracted; and further extracting the recognition information from the recognition frame, so as to perform a recognition operation on the video file.

In the technical solution, a recognition frame containing recognition information may be added to the middle or both ends of the data stream corresponding to the video file. In order to realize the separation of the video data, the frame head part of the recognition frame should contain type identification for recognizing the type of the recognition frame in the video data by the second terminal; after the above type identification is recognized, it is determined that the data frame is a recognition frame; specifically, for example the recognition frame head mainly consists of special characters, so as to identify the recognition frame. After that, the second terminal continues to analyze other information such as recognition frame length, so as to completely determine the corresponding recognition frame. The recognition frame should further include an information part which contains the recognition information and the like of the photographic object, so as to recognize the photographic object in the video. The way of using the recognition frame can make it convenient that the recognition information is encoded in the video data, and make it convenient that the recognition frame is worked out from the video data by analysis, the recognition information of the photographic object is extracted from the information part of the recognition frame, and the photographic object in the video file is recognized through the recognition information.

In the above technical solution, preferably, the method further includes: at least one of the first terminals is taken as a parent node, and all of the photographic object entities are taken as children nodes, so as to form an Ad Hoc hierarchical network structure.

In the technical solution, the Ad Hoc hierarchical network structure does not have to rely on the existing fixed communication network infrastructure, and can rapidly spread the used network system. Network nodes in the network cooperate with each other, and communicate and exchange information via wireless links, to share information and service. Each network node can dynamically, optionally, frequently enter and leave the network often without needing to warn or inform in advance, and without damaging the communication between other nodes in the network. The first terminal may be a camera, the camera is taken as the parent node of Ad Hoc, the photographic objects (such as clothes) are taken as the children nodes, then according to the structural characteristics of the Ad Hoc network, one parent node (i.e., camera) may correspond to a plurality of children nodes (i.e., a plurality of the above information transceiving devices), and different network nodes do not influence each other, so as to improve the stability and flexibility of the video acquisition system.

In the above technical solution, preferably, the method further includes: the first terminal further receives controllable information corresponding thereto sent by the at least one of the photographic object entities, wherein the first terminal encodes the controllable information and the recognition information in association into the video data, and the second terminal further obtains controllable information associated with at least one of the photographic objects from the video data, and performs an operation function on the designated photographic object according to the controllable information when the operation action on the designated operation area is detected; or when the second terminal detects the operation action on the designated operating area and reports the detection result up to the first terminal, the first terminal sends the controllable information corresponding to the designated operation area to the second terminal so that the second terminal performs an operation function on the designated photographic object according to the controllable information.

In the technical solution, the second terminal may perform default processing operations on all photographic objects, for example perform amplification processing on all of the clicked photographic objects, store each clicked photographic object, or directly call a browser to perform "Search by Image" on the clicked photographic object. Certainly, in order to realize more processing operation modes, the controllable information and recognition information may be associated and encoded into the video data, so that when the user performs an operation on the recognized photographic object, the second terminal performs a corresponding function according to the controllable information. Specifically, the controllable information may be encoded into the above recognition frame, or separately encoded as a control information frame, and the recognition frame (the control information frame may also be included) is integrated with the video file obtained by shooting so as to form video data. The second terminal performs a corresponding function according to the controllable information worked out by analysis. After being worked out by analysis by the second terminal, the controllable information may, together with the associated recognition information, be stored in a matching database, then when the user performs an operation on the recognized photographic object, the controllable information associated with the recognition information of the designated object is retrieved from the matching database to perform an operation function on the photographic object.

Certainly, when the first terminal encodes the controllable information into the video data, the controllable information and the recognition information associated with the photographic object in the video data are often sent together to the second terminal; however, in order to save network resources and increase the transmission speed of the video data, the first terminal may, according to the detection result reported by the second terminal, send the corresponding controllable information to the second terminal only when an operation action exists in the operation area corresponding to a photographic object, which helps save the storage space of the second terminal.

In the above technical solution, preferably, the controllable information includes: menu data, link information, and control command; and the operating function accordingly includes: creating and displaying a corresponding interactive menu according to the menu data, opening the link information, and executing the control command.

Specifically, in the technical solution, for example when the user watches a shopping video by a cellphone, the cellphone recognizes a piece of clothing in the video, and the user touches the screen to click on the operation area of the clothing, then an interactive menu for example containing "buy, price, advice" pops up, or the "buy" page is directly linked to, and there may also be an amplification processing on the clothing image and so forth, so the further operation of the user is facilitated.

Figure 2:
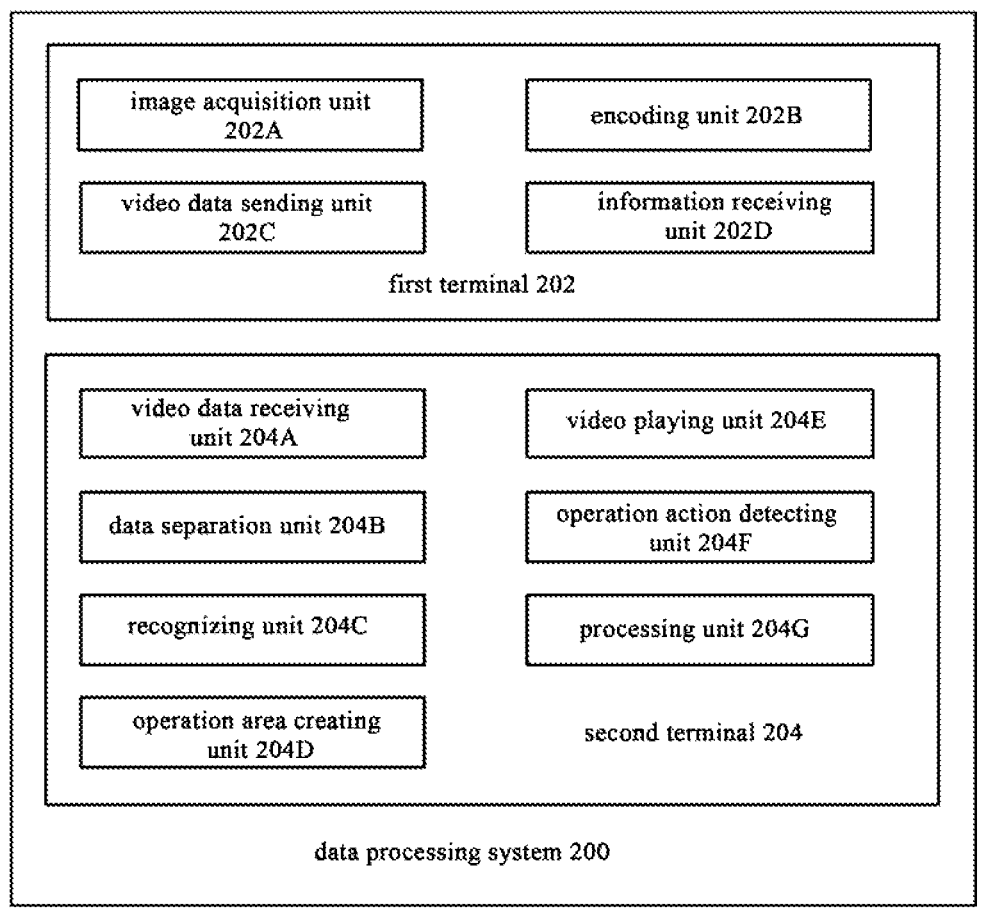
FIG. 2 shows a block diagram of a data processing system according to an embodiment of the present invention.

FIG. 2 shows a block diagram of a data processing system according to an embodiment of the present invention.

As shown in FIG. 2, the data processing system 200 according to the present invention includes a first terminal 202 and a second terminal 204, wherein the first terminal 202 includes an image acquisition unit 202A for performing image acquisition on at least one photographic object entity; an encoding unit 202B for encoding the acquired image and recognition information corresponding to at least one of the photographic object entities to form video data; and a video data sending unit 202C for sending the video data formed by the encoding unit 202B to the second terminal 204 through a network; the second terminal 204 includes: a video data receiving unit 204A for receiving the video data; a data separation unit 204B for performing data separation on the video data to obtain a video file and recognition information associated with at least one photographic object in the video file; an recognizing unit 204C for recognizing at least one photographic object in the video file according to the recognition information; an operation area creating unit 204D for, according to the at least one recognized photographic object, forming an operation area corresponding to at least one of the photographic objects in the video file; a video playing unit 204E for playing the video file; an operation action detecting unit 204F for detecting an operation action on a designated operation area when the video playing unit 204E plays the video file; and a processing unit 204G for performing an operation function associated with the designated photographic object corresponding to the designated operation area when an operation action on the designated operation area is detected by the operation action detecting unit 204F.

In the technical solution, through recognition of the photographic object in the video, a user may, when watching a video, directly perform an operation on the recognized object, so as to improve the user experience. The video file here may be a video transmitted in a wired or wireless mode after being shot by a camera in real time, or a non real-time video shot at any other moment. The corresponding operation area created by recognizing the photographic object in the video may be an area corresponding to the edge of display of the photographic object, or a rectangular area or the like which contains the photographic object; specifically, the operation area may be transparent, or may be displayed in a certain condition (for example when a video playing mode capable of showing the operation area is set and entered). Since the video is dynamic, when the photographic object in the video moves (it moves on its own, or the relative position of the photographic object is changed on the terminal screen due to the movement of the lens), the corresponding operation area should also change accordingly so that the user only has to directly perform an operation on the photographic object without needing to pay special attention to the position of the operating area.

Preferably, the video data may be obtained and then transmitted to the second terminal 204 by the first terminal 202, or especially may be obtained in real time by the first terminal 202 and transmitted to the second terminal 204 through the network. When in the process of shooting, the first terminal 202 obtains the recognition information of the photographic object being shot, and the first terminal 202 encodes that information and the photographic video file into video data, so the first terminal 202 does not have to perform analysis and feature acquisition on the photographic object, thus reducing the requirement for the first terminal 202, and facilitating recognition of the photographic object in the video by the second terminal 204.

Specifically, for example when watching a video by a cellphone, computer or other terminal device, a user clicks on a piece of clothing in the video (or instead, for example places the mouse in the operation area corresponding to the photographic object); if the clothing is a recognized photographic object, then a corresponding operation may be realized, which includes, for example, linking to a webpage (calling a browser and switching to the browser interface, or displaying on the video player interface in the form of a bubble box) that provides the brand information and/or purchase information about the clothing; for another example, a menu containing "buy, price, advice" (which is taken as an example, and the menu may also contain other information) pops up, and the user may realize further control operation by selection operations on the menu. In addition, the photographic object entity corresponds to a storage device and an information transceiving device (not shown in the figure), wherein the storage device stores the recognition information of the photographic object entity, which is pre-stored in the storage device, and the information transceiving device is used for sending the recognition information to the first terminal 202. When the first terminal 202 performs an acquisition on the recognition information of the photographic object entity, it may be achieved by sending a recognition information acquisition instruction, and then the information transceiving device receiving that instruction sends corresponding recognition information to the first terminal 202. The storage device and the information transceiving device may be located in the photographic object entity; for example, the photographic object entity is a smart phone; the storage device and the information transceiving device may also be associated with the photographic object entity, for example be connected to the photographic object entity, be placed near the photographic object entity, or be such that since the storage device contains the recognition information of a photographic object entity and the information transceiving device is used for transmitting the recognition information, the photographic object entity is considered to be associated with the storage device and the information transceiving device.

Further, one storage device may correspond to one or more photographic object entities, and one information transceiving device may also correspond to one or more storage devices. When receiving the recognition information acquisition instruction sent by the first terminal 202, the information transceiving device may send all of the recognition information in the storage device associated therewith to the first terminal 202; or it is also possible to provide another image acquisition device, which determines the photographic object entity shot by it by monitoring the real-time state of the first terminal 202, so that the information transceiving device only sends this part of recognition information of the photographic object entity capable of being shot to the first terminal 202, and so that the amount of data to be processed by the first terminal 202 is reduced.

Preferably, in the above technical solution, the first terminal 202 further includes: an information receiving unit 202D for receiving recognition information corresponding thereto sent by at least one of the photographic object entities, so as to encode the information into the video data.

In the technical solution, the recognition information may be obtained by the first terminal 202 from the photographic object entity, which helps establish an actual association between the recognition information and the specific photographic object entity to facilitate managing the photographic object entity and the corresponding recognition information.

Preferably, in the above technical solution, the second terminal 204 further includes: a pre-storing unit (not shown in the figure) for pre-storing recognition features, wherein the recognizing unit 204C matches the content in the image frame of the video file with the recognition features pre-stored in the pre-storing unit to recognize at least one photographic object in the video file. In the technical solution, the recognition features of one or more objects are pre-stored in the second terminal 204 or in a cloud storage space corresponding to the second terminal 204, so that at any moment after the second terminal 204 obtains the video file, or in the process of playing the video file (pre-obtained or received in real time), the content in the image frame of the video is matched with pre-stored recognition features to recognize the photographic object in the video. Since the pre-stored recognition features are used, no special requirement exists for the video file itself, all video files may be suitable for the technical solution, they may be downloaded from the network by the second terminal 204, obtained from another terminal, or shot by the second terminal 204 itself, and thus there is greater versatility. Meanwhile, since the photographic object in a video file is not always in change, after the photographic object in an image frame is recognized, the image frame may be compared with the pixel information in one or more image frames following it to determine whether a change in the photographic object occurs; if a change exists, recognition may be performed; otherwise, no re-recognition is needed, so as to help improve the recognition efficiency and reduce the requirement for the processing capability of the terminal.

Accordingly, each pre-stored recognition feature may, in simple terms, be the image of an object, in which case the object may be recognized by comparing with the picture in the video file; further, the recognition features may also be some characteristic parameters; for example, for "clothes", parameters such as "an opening in the front and symmetrical sleeves to the left and right" may be included so that the second terminal 204 can "know" what "clothes" are, and additionally with the features such as color, size, and style of the clothes themselves which need be recognized, intelligent recognition of "clothes" may be realized by the second terminal 204. Meanwhile, that the recognition feature is pre-stored in the second terminal 204 itself and that it is according to the recognition information sent by the first terminal 202 are not contradictory; the object may be recognized by only using one of them, or using both at the same time.

Preferably, in the above technical solution, the data separation unit 204B includes: a frame extraction subunit (not shown in the figure) for extracting a recognition frame from the video data, and obtaining the video file remaining after the recognition frame is extracted; a frame analysis subunit (not shown in the figure) for further extracting the recognition information from the recognition frame, so as to allow the recognition unit to perform a recognition operation on the video file.

In the technical solution, a recognition frame containing recognition information may be added to the middle or both ends of the data stream corresponding to the video file. In order to realize the separation of the video data, the frame head part of the recognition frame should contain type identification for recognizing the type of the recognition frame in the video data by the second terminal 204; after the above type identification is recognized, it is determined that the data frame is a recognition frame; specifically, for example the recognition frame head mainly consists of special characters, so as to identify the recognition frame. After that, the second terminal 204 continues to analyze other information such as recognition frame length, so as to completely determine the corresponding recognition frame. The recognition frame should further include an information part which contains the recognition information and the like of the photographic object, so as to recognize the photographic object in the video. The way of using the recognition frame can make it convenient that the recognition information is encoded in the video data, and make it convenient that the recognition frame is worked out from the video data by analysis, the recognition information of the photographic object is extracted from the information part of the recognition frame, and the photographic object in the video file is recognized through the recognition information.

In the above technical solution, preferably, the method further includes: at least one of the first terminals 202 is taken as a parent node, and all of the photographic object entities are taken as children nodes, so as to form an Ad Hoc hierarchical network structure.

In the technical solution, the Ad Hoc hierarchical network structure does not have to rely on the existing fixed communication network infrastructure, and can rapidly spread the used network system. Network nodes in the network cooperate with each other, and communicate and exchange information via wireless links, to share information and service. Each network node can dynamically, optionally, frequently enter and leave the network often without needing to warn or inform in advance, and without damaging the communication between other nodes in the network. The first terminal 202 may be a camera, the camera is taken as the parent node of Ad Hoc, the photographic objects (such as clothes) are taken as the children nodes, then according to the structural characteristics of the Ad Hoc network, one parent node (i.e., camera) may correspond to a plurality of children nodes (i.e., a plurality of the above information transceiving devices), and different network nodes do not influence each other, so as to improve the stability and flexibility of the video acquisition system.

Preferably, in the above technical solution, the first terminal 202 further receives controllable information corresponding thereto sent by the at least one of the photographic object entities, wherein the encoding unit 202B is further used for encoding the controllable information and the recognition information in association into the video data, the data separation unit 204B is further used for obtaining controllable information associated with at least one of the photographic objects from the video data, and the processing unit 204G is further used for performing an operation function on the designated photographic object according to the controllable information when the operation action on the designated operation area is detected; or when the second terminal 204 detects the operation action performed on the designated operating area, it further reports the detection result up to the first terminal 202, and the first terminal 202 sends the controllable information corresponding to the designated operation area accordingly to the second terminal 204 so that the processing unit 204G performs an operation function on the designated photographic object according to the controllable information.

In the technical solution, the second terminal 204 may perform default processing operations on all photographic objects, for example perform amplification processing on all of the clicked photographic objects, store each clicked photographic object, or directly call a browser to perform "Search by Image" on the clicked photographic object. Certainly, in order to realize more processing operation modes, the controllable information and recognition information may be associated and encoded into the video data, so that when the user performs an operation on the recognized photographic object, the second terminal 204 performs a corresponding function according to the controllable information. Specifically, the controllable information may be encoded into the above recognition frame, or separately encoded as a control information frame, and the recognition frame (the control information frame may also be included) is integrated with the video file obtained by shooting so as to form video data. The second terminal 204 performs a corresponding function according to the controllable information worked out by analysis. After being worked out by analysis by the second terminal 204, the controllable information may, together with the associated recognition information, be stored in a matching database, then when the user performs an operation on the recognized photographic object, the controllable information associated with the recognition information of the designated object is retrieved from the matching database to perform an operation function on the photographic object. Certainly, when the first terminal 202 encodes the controllable information into the video data, the controllable information and the recognition information associated with the photographic object in the video data are often sent together to the second terminal 204; however, in order to save network resources and increase the transmission speed of the video data, the first terminal 202 may, according to the detection result reported by the second terminal 204, send the corresponding controllable information to the second terminal 204 only when an operation action exists in the operation area corresponding to a photographic object, which helps save the storage space of the second terminal 204.

In the above technical solution, preferably, the controllable information separated by the data separation unit 204B includes: menu data, link information, and control command; and the operating function performed by the processing unit 204G accordingly includes: creating and displaying a corresponding interactive menu according to the menu data, opening the link information, and executing the control command.

Specifically, in the technical solution, for example when the user watches a shopping video by a cellphone, the cellphone recognizes a piece of clothing in the video, and the user touches the screen to click on the operation area of the clothing, then an interactive menu for example containing "buy, price, advice" pops up, or the "buy" page is directly linked to, and there may also be an amplification processing on the clothing image and so forth, so the further operation of the user is facilitated.

Figure 3:
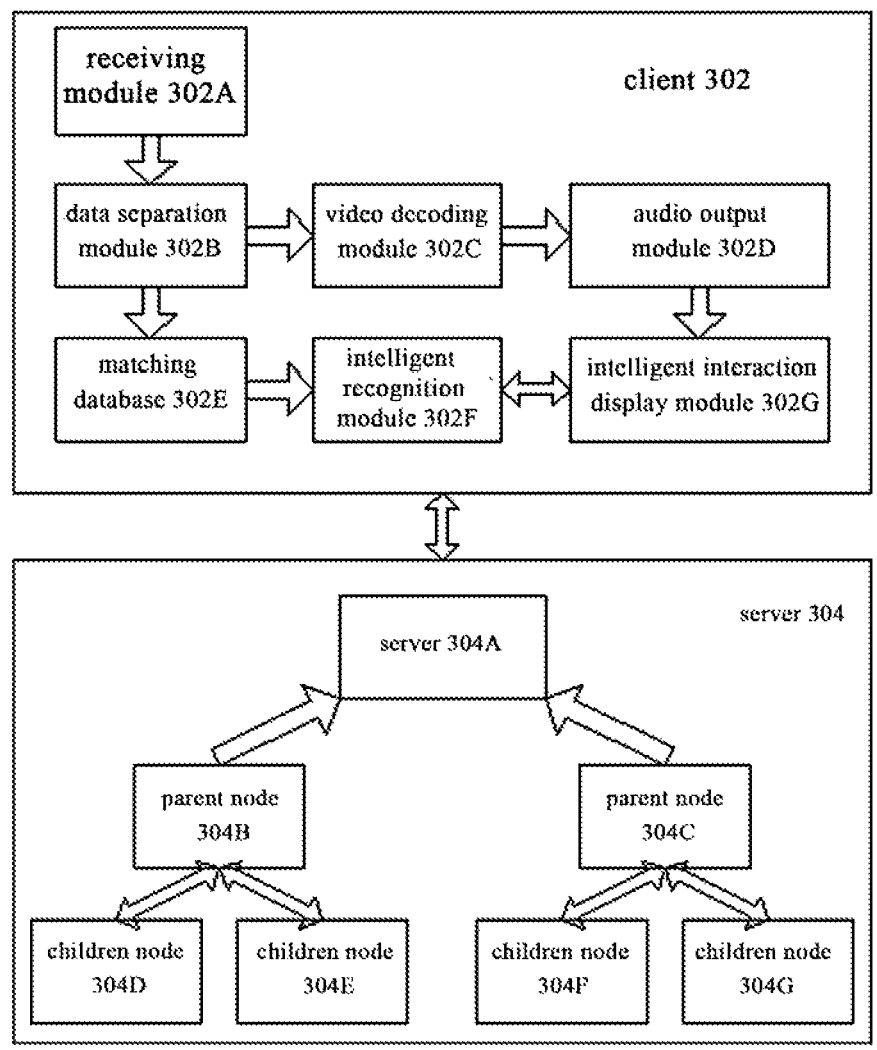
FIG. 3 shows a block diagram of an intelligent video interactive system based on an Ad Hoc network structure according to an embodiment of the present invention.

FIG. 3 shows a block diagram of an intelligent video interactive system based on an Ad Hoc network structure according to an embodiment of the present invention.

As shown in FIG. 3, the intelligent video interactive system based on the Ad Hoc network structure according to the embodiment of the present invention includes a client 302 and a server 304.

Used by the server 304 in the embodiment is an Ad Hoc hierarchical network structure for information acquisition to form video data for the downloading by the client 302, and the client 302 may play it in real time or at any time according to the needs. Network nodes in the Ad Hoc network cooperate with each other, and communicate and exchange information via wireless links, to share information and service. Each network node can dynamically, optionally, frequently enter and leave the network often without needing to warn or inform in advance, and without damaging the communication between other nodes in the network, thus being greatly flexible. Certainly, the way of using the Ad Hoc network structure is only relatively preferred; if other network structure is used to realize the information acquisition process in the present invention, it should also be included in the protection scope of the present invention.

The server 304 includes:

a server 304A for providing downloading of video data by the client 302, wherein the video data may be video data containing a recognition frame, or a video file not containing a recognition frame. The server 304A may transmit any of the two kinds of video data mentioned above according to the different selections of the client.

The parent node 304B and the parent node 304C are the parent nodes in the Ad Hoc network (apparently, the number of the parent nodes may vary according to the needs, namely the system may only contain one parent node, or contain 2 or more parent nodes, and here the case of 2 nodes is taken as an example for illustration), the nodes do not affect each other, and may dynamically, optionally, frequently enter and leave the network so that the information acquisition system has great flexibility. Here the parent node may be a camera, and is used for dynamically acquiring the image information of the photographic object (i.e., the children node) according to the request of the server 304A. When a parent node performs acquisition on the recognition information and/or controllable information of a children node, it may be achieved by sending recognition information and/or controllable information acquisition instruction, and then on receipt of that instruction, the children node sends corresponding recognition information and/or controllable information to the parent node. Accordingly, one parent node may correspond to a plurality of children nodes. If the parent node 304B corresponds to the children nodes 304D and 304E, the children nodes 304D and 304E also do not affect each other.

The children nodes 304D, 304E, 304F, and 304G are children nodes in the Ad Hoc network; like the parent nodes, they may dynamically, optionally, frequently enter and leave the network, and do not affect the work of any other network node. On receipt of the instruction for acquiring recognition information and/or controllable information which is sent by a parent node, the children node transmits the recognition information and controllable information to the parent node.

The client 302 includes:

a receiving module 302A, a data separation unit 302B, a video decoding module 302C, an audio output module 302D, a matching database 302E, an intelligent recognition module 302F, and an intelligent interaction display module 302G.

The receiving module 302A is used for receiving video data obtained from the server, the video data containing the recognition information for recognizing the photographic object.

The data separation unit 302B is used for performing data separation on the video data to obtain the video file and recognition information associated with at least one photographic object in the video file, and controllable information associated with the recognition information. Specifically, the video data contains a recognition frame, which includes characteristics such as recognition frame head, recognition frame length and recognition frame information. The recognition frame head mainly consists of special characters, so as to identify the recognition frame; the recognition frame length is used to mark the length of the recognition frame information; the recognition frame information part consists of special character code formats, and contains the recognition information, controllable information and the like of the photographic object. Therefore, the recognition frame may be separated from the video data, and analyzed; the recognition information and controllable information of the photographic object are extracted from the information part of the recognition frame, and the photographic object in the video file is recognized through the recognition information.

The video decoding module 302C is used for decoding the video file.

The audio output module 302D is used for outputting the decoded audio/video for playing.

The matching database 302E is used for saving the recognition information and controllable information which are separated from the video data.

The intelligent recognition module 302F is used for recognizing the photographic object in the video file according to the separated recognition information, and creating a corresponding operation area according to the recognized photographic object.

The intelligent interaction display module 302G is used for performing a corresponding operation according to the separated controllable information when an operation is performed on the photographic object in the operation area of the recognized photographic object, when a video file is played.

The technical solution of the present invention is illustrated below in detail in conjunction with FIGS. 4 and 5A-5C.

Figure 4:
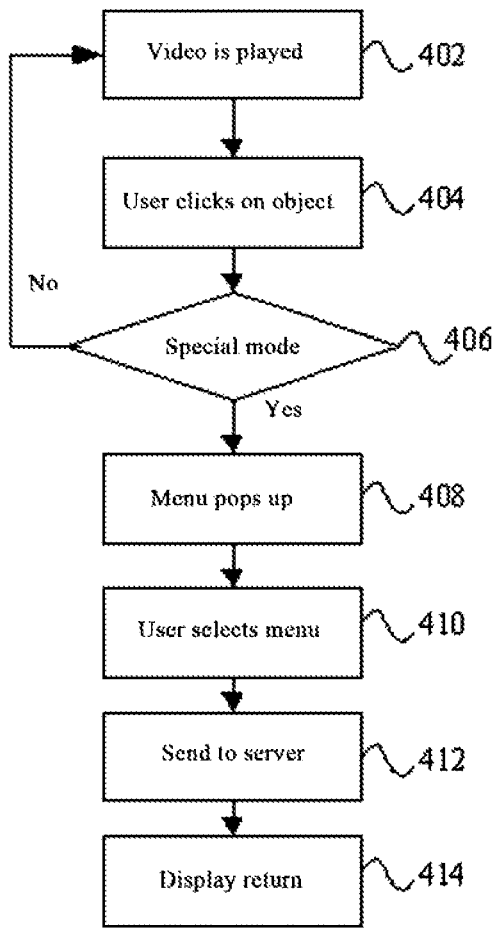
FIG. 4 shows a flowchart of an intelligent video interactive system according to an embodiment of the present invention.

FIG. 4 shows a flowchart of an intelligent video interactive system according to an embodiment of the present invention.

As shown in FIG. 4, the workflow of the intelligent video interactive system according to the embodiment of the present invention includes:

Step 402, a user selects a corresponding video file for playing, namely selects video data containing data information, or a simple video file.

Step 404, when wanting to know the specific information of an object (photographic object), the user can do so by clicking on the object. In this embodiment, the user first performs an operation (i.e., clicking; certainly also possibly through other operation such as by touching the screen) on the designated object in a video, and then determines whether the designated object is a photographic object capable of being recognized. Certainly, also possibly, the photographic object is recognized first, and after being recognized, the photographic object is subjected to special displaying, and then the user performs an operation on the recognized photographic object.

Step 406, it is determined which video mode is selected by the user for playing; if a special mode is selected, step 408 is performed; otherwise, the process jumps to step 402. In this embodiment, the user may select video mode, wherein the special mode is the mode which allows the photographic object to be recognized as described in the technical solution of the present invention, and which supports the user in performing an operation on the recognized photographic object in the video playing process. If the user selects the special mode, then the video data containing data information may be separated to obtain the recognition information and controllable information of the photographic object so as to perform recognition and operation on the photographic object; if the video played is a video file not containing data information, then the photographic object may be recognized through the recognition feature stored locally or stored in the cloud by the terminal. If selected by the user is not the special mode, then only video playing is allowed, and no operation on the photographic object can be performed.

Step 408, an interactive menu pops up to perform the dynamic interaction according to the selected content. The interactive menu which pops up is intended for a corresponding operation according to the controllable information.

As shown in 5A, the recognition information separated from the video data and the controllable information associated with the recognition information are stored into the matching database in the process of playing a video at the cellphone terminal (or other terminals such as tablet computer, PC or the like), the photographic object 502 is recognized according to the recognition information (or the recognition feature stored locally or stored in the cloud), and special displaying may be performed on the recognized photographic object 502 (for example, a high light range is displayed), so an operation area (not shown in the figure) corresponding to the photographic object 502 is created near the photographic object 502. The user may perform an operation on the photographic object 502 by clicking on the operation area of the photographic object, the terminal retrieves the controllable information in the matching data according to the operation on the photographic object 502 to perform a corresponding operation, as shown in the figure, an interactive menu 504 pops up, so the user may perform a further operation on the photographic object 502 through the interactive menu 504. Certainly, also possibly as shown in FIG. 5B, a bubble box 506 is pop up after the photographic object 502 is clicked on, so the information about the photographic object 502 may obtained from the bubble box 506. A amplified display may also be performed on the photographic object 502 after the photographic object 502 is clicked on, or a browser is called to directly switch to the corresponding website link page (as shown in FIG. 5C).

Figure 5A:
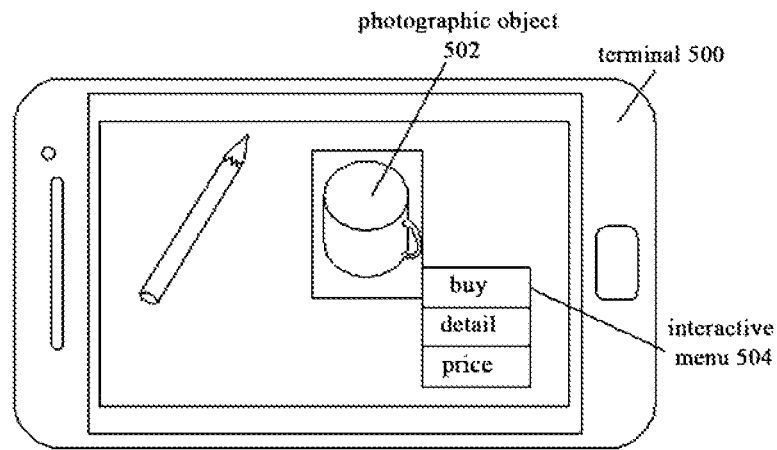
FIGS. 5A-5C show schematic diagrams of an intelligent video interactive system according to an embodiment of the present invention.
Figure 5B:
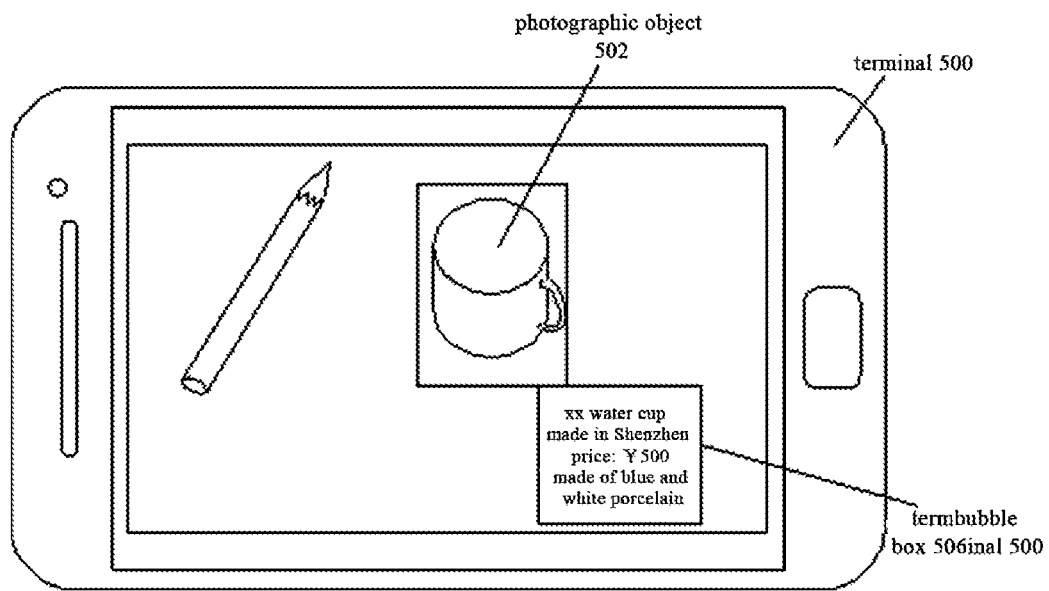
Figure 5C:
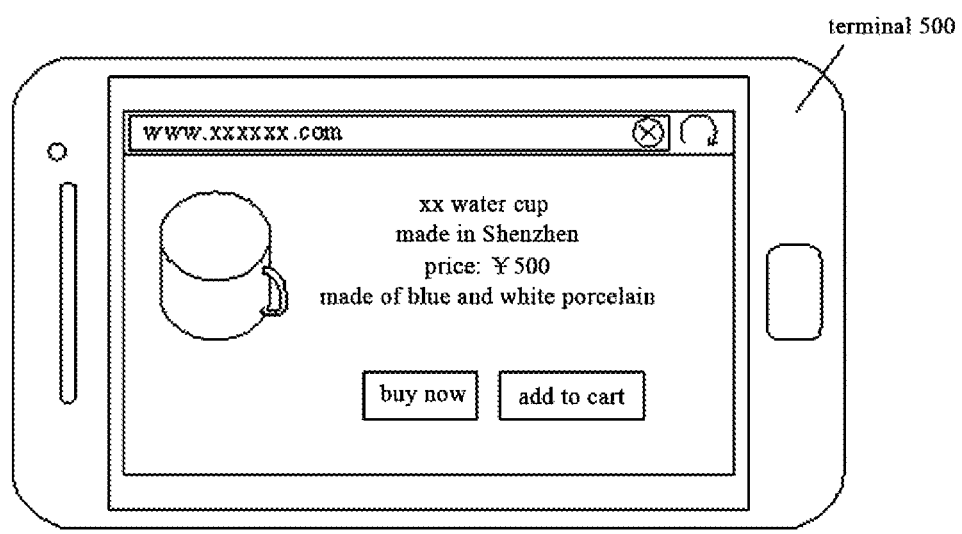

Step 410, the user selects a menu, such as the "detail" in FIG. 5A.

Step 412, the operation information selected by the user is sent to a designated server, so a corresponding operation is performed according to the recognized controllable information. The operation function corresponding to the interactive menu is stored on the server in this embodiment, and a response to the operation information may be made according to the stored operation function by sending the selected operation information to the server.

Step 414, the server sends back the operation result, so for example a bubble box of the detailed information about the photographic object 502 as shown in FIG. 5B may pop up.

The technical solution of the present invention is described above in detail in conjunction with the accompanying drawings; considering that in the prior art, when shopping online, a user purchases products by browsing webpage pictures, but the deviation between the real goods purchased and the online photos is relatively large and the user cannot perform an operation on the photographic object in a video when watching the video, the operation on the photographic object can be performed only by separate network searching and so forth. Therefore, the present invention provides a new data processing scheme, whereby the photographic object in the video may be recognized, and a user may, when watching a video, perform an operation on the photographic object in the video without needing to perform the operation by separately searching the network and so forth, which helps simplify the user operation and improve the user experience.

Described above are only the preferred embodiments of the present invention, which are not intended for limiting the present invention; for the person of ordinary skill in the art, a variety of modifications and variations may be made to the present invention. Any modifications, equivalent replacements and improvements without departing from the spirit and essence of the present invention should be encompassed within the protection scope of the present invention.

The invention claimed is:

1. A data processing method, comprising:
 a first terminal performs a first image acquisition on at least one photographic object entity of a plurality of photographic object entities, and encodes the acquired image and recognition information corresponding to purchasing information of the at least one photographic object entity to form video data which is sent to a second terminal through a network;
 the second terminal receives the video data, and performs data separation on the video data to obtain a video file and recognition information associated with at least one photographic object in the video file;
 the second terminal recognizes at least one photographic object in the video file according to the recognition information, and forms an operation area corresponding to at least one of the photographic objects in the video file; and
 when the video file is played, the second terminal, according to a detected operation action on a designated operation area, performs an operation function associated with a designated photographic object corresponding to the designated operation area,
 wherein the recognition information comprises one or more characteristics of the at least one photographic object entity for purchase.

2. The data processing method of claim 1, further comprising:
 the first terminal receives recognition information corresponding to the first acquisition sent by the at least one photographic object entity, so as to encode the information into the video data.

3. The data processing method of claim 1, wherein the first terminal is taken as a parent node, and the plurality of photographic object entities are taken as children nodes, so as to form an Ad Hoc hierarchical network structure.

4. The data processing method claim 1, further comprising:
 the first terminal further receives controllable information corresponding to the first acquisition sent by the at least one photographic object entity, wherein the first terminal encodes the controllable information and the recognition information in association into the video data, and the second terminal further obtains controllable information associated with at least one of the photographic objects from the video data, and performs an operation function on the designated photographic object according to the controllable information when the operation action on the designated operation area is detected;

or when the second terminal detects the operation action on the designated operating area and reports the detection result up to the first terminal, the first terminal sends the controllable information corresponding to the designated operation area to the second terminal so that the second terminal performs an operation function on the designated photographic object according to the controllable information.

5. The data processing method of claim 2, further comprising:

the first terminal further receives controllable information corresponding to the first acquisition sent by the at least one photographic object entity, wherein the first terminal encodes the controllable information and the recognition information in association into the video data, and the second terminal further obtains controllable information associated with at least one of the photographic objects from the video data, and performs an operation function on the designated photographic object according to the controllable information when the operation action on the designated operation area is detected;

or when the second terminal detects the operation action on the designated operating area and reports the detection result up to the first terminal, the first terminal sends the controllable information corresponding to the designated operation area to the second terminal so that the second terminal performs an operation function on the designated photographic object according to the controllable information.

6. The data processing method of claim 3, further comprising:

the first terminal further receives controllable information corresponding to the first acquisition sent by the at least one photographic object entity, wherein the first terminal encodes the controllable information and the recognition information in association into the video data, and the second terminal further obtains controllable information associated with at least one of the photographic objects from the video data, and performs an operation function on the designated photographic object according to the controllable information when the operation action on the designated operation area is detected;

or when the second terminal detects the operation action on the designated operating area and reports the detection result up to the first terminal, the first terminal sends the controllable information corresponding to the designated operation area to the second terminal so that the second terminal performs an operation function on the designated photographic object according to the controllable information.

7. The data processing method of claim 4, wherein the controllable information comprises: menu data, link information, and control command; and the operating function accordingly comprises:

creating and displaying a corresponding interactive menu according to the menu data, opening the link information, and executing the control command.

8. The data processing method of claim 5, wherein the controllable information comprises: menu data, link information, and control command; and the operating function accordingly comprises:

creating and displaying a corresponding interactive menu according to the menu data, opening the link information, and executing the control command.

9. The data processing method of claim 6, wherein the controllable information comprises: menu data, link information, and control command; and the operating function accordingly comprises:

creating and displaying a corresponding interactive menu according to the menu data, opening the link information, and executing the control command.

10. A data processing system, comprising a first terminal and a second terminal, wherein the first terminal comprises:

a camera configured to perform a first image acquisition on at least one photographic object entity of a plurality of photographic entities;

a first processor configured to encode the acquired image and recognition information corresponding to purchasing information of the at least one photographic object entity to form video data; and the first processor is further configured to send the video data formed by the first processor to the second terminal through a network; and the second terminal comprises:

a second processor configured to receive the video data;

the second processor further configured to perform data separation on the video data to obtain a video file and recognition information associated with at least one photographic object in the video file;

the second processor further configured to recognize at least one photographic object in the video file according to the recognition information;

the second processor further configured to, according to the at least one recognized photographic object, form an operation area corresponding to at least one of the photographic objects in the video file;

for the second processor further configured to play the video file;

the second processor further configured to detect an operation action on a designated operation area when the second processor plays the video file; and the second processor further configured to perform an operation function associated with the designated photographic object corresponding to the designated operation area when an operation action on the designated operation area is detected by the second processor, wherein the recognition information comprises one or more characteristics of the at least one photographic object entity for purchase.

11. The data processing system of claim 10, wherein the first processor is further configured to receive recognition information corresponding to the first acquisition sent by the at least one photographic object entity, so as to encode the information into the video data.

12. The data processing system of claim 10, wherein the first terminal is taken as a parent node, and the plurality of photographic object entities are taken as children nodes, so as to form an Ad Hoc hierarchical network structure.

13. The data processing system of claim 10, wherein the first terminal further receives controllable information corresponding to the first acquisition sent by the at least one photographic object entity, wherein the first processor is further configured to encode the controllable information and the recognition information in association into the video data, the second processor is further configured to obtain controllable information associated with at least one of the photographic objects from the video data, and the second processor is further configured to perform an operation function on the designated photographic object according to the controllable information when the operation action on the designated operation area is detected;

or when the operation action on the designated operating area is detected, the second terminal further reports the detection result up to the first terminal, and the first terminal sends the controllable information corresponding to the designated operation area accordingly to the second terminal so that the second processor is further configured to perform an operation function on the designated photographic object according to the controllable information.

14. The data processing system of claim 11, wherein the first terminal further receives controllable information corresponding to the first acquisition sent by the at least one photographic object entity, wherein the first processor is further configured to encode the controllable information and the recognition information in association into the video data, the second processor is further used for obtaining controllable information associated with at least one of the photographic objects from the video data, and the second processor is further configured to perform an operation function on the designated photographic object according to the controllable information when the operation action on the designated operation area is detected;

or when the operation action on the designated operating area is detected, the second terminal further reports the detection result up to the first terminal, and the first terminal sends the controllable information corresponding to the designated operation area accordingly to the second terminal so that the second processor performs an operation function on the designated photographic object according to the controllable information.

15. The data processing system of claim 12, wherein the first terminal further receives controllable information corresponding to the first acquisition sent by the at least one photographic object entity, wherein the first processor is further configured to encode the controllable information and the recognition information in association into the video data, the second processor is further configured to obtain controllable information associated with at least one of the photographic objects from the video data, and the second processor is further used for performing an operation function on the designated photographic object according to the controllable information when the operation action on the designated operation area is detected;

or when the operation action on the designated operating area is detected, the second terminal further reports the detection result up to the first terminal, and the first terminal sends the controllable information corresponding to the designated operation area accordingly to the second terminal so that the second processor performs an operation function on the designated photographic object according to the controllable information.

16. The data processing system of claim 13, wherein the controllable information separated by the second processor comprises: menu data, link information, and control command; and the operation function performed by the second processor accordingly comprises:

creating and displaying a corresponding interactive menu according to the menu data, opening the link information, and executing the control command.

17. The data processing system of claim 14, wherein the controllable information separated by the second processor comprises: menu data, link information, and control command; and the operation function performed by the second processor accordingly comprises:

creating and displaying a corresponding interactive menu according to the menu data, opening the link information, and executing the control command.

18. The data processing system of claim 15, wherein the controllable information separated by the second processor comprises: menu data, link information, and control command; and the operation function performed by the second processor accordingly comprises:

creating and displaying a corresponding interactive menu according to the menu data, opening the link information, and executing the control command.

* * * * *